US010697806B2

(12) United States Patent
Koste

(10) Patent No.: US 10,697,806 B2
(45) Date of Patent: Jun. 30, 2020

(54) INTEGRATED FIBER-OPTIC PERTURBATION SENSOR

(71) Applicant: General Electric Company, Schenectady, NY (US)

(72) Inventor: Glen Peter Koste, Schenectady, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 22 days.

(21) Appl. No.: 16/193,987

(22) Filed: Nov. 16, 2018

(65) Prior Publication Data

US 2020/0158543 A1 May 21, 2020

(51) Int. Cl.
G02B 6/00 (2006.01)
G01N 29/24 (2006.01)
G01D 5/353 (2006.01)

(52) U.S. Cl.
CPC ..... *G01D 5/35358* (2013.01); *G01D 5/35329* (2013.01)

(58) Field of Classification Search
CPC ............ G01D 5/35358; G01D 5/35329
USPC .................................... 250/227.19
See application file for complete search history.

(56) References Cited

U.S. PATENT DOCUMENTS

| 5,194,847 | A | 3/1993 | Taylor et al. |
| 5,373,487 | A | 12/1994 | Crawford et al. |
| 8,189,971 | B1 | 5/2012 | Vaissie et al. |
| 8,315,486 | B2 | 11/2012 | Pearce et al. |
| 8,607,093 | B2 | 12/2013 | Dehaan et al. |
| 9,080,949 | B2 | 7/2015 | Mestayer et al. |
| 10,309,825 | B2 * | 6/2019 | Suh ........................ G01H 9/004 |
| 10,451,448 | B2 * | 10/2019 | Rowen ............... G01D 5/35316 |
| 2006/0127006 | A1 | 6/2006 | Shaubanu et al. |
| 2009/0097016 | A1 | 4/2009 | Davies et al. |
| 2016/0071526 | A1 | 3/2016 | Wingate et al. |

(Continued)

FOREIGN PATENT DOCUMENTS

| KR | 20170067632 A | 6/2017 |
| WO | 2017190063 A2 | 11/2017 |
| WO | 2018038739 A1 | 3/2018 |

OTHER PUBLICATIONS

Daley, Thomas M.; "Field testing of fiber-optic distributed acoustic sensing (DAS) for subsurface seismic monitoring", The Leading Edge, vol. 32, Issue: 6, pp. 699-706, Jun. 2013.

(Continued)

*Primary Examiner* — Seung C Sohn
(74) *Attorney, Agent, or Firm* — Fletcher Yoder, P.C.

(57) ABSTRACT

A system may include a substrate, a computing device that performs one or more edge processing operations disposed on the substrate, and an integrated photonic circuit that performs distributed acoustic sensing operations and is also disposed on the substrate. The integrated photonic circuit may include a light source, a circulator, and a photodiode. The light may transmit a first light pulse. The circulator may transmit the first light pulse to a fiber-optic cable. The circulator may also receive a back-scattered light pulse based at least in part on the first light pulse. The photodiode may receive at least a portion of the back-scattered light pulse. The photodiode may generate one or more electrical signals based at least in part on the portion of the back-scattered light pulse.

20 Claims, 10 Drawing Sheets

(56) References Cited

U.S. PATENT DOCUMENTS

2017/0076563 A1 3/2017 Guerriero et al.
2018/0031413 A1 2/2018 Stokely et al.

OTHER PUBLICATIONS

Parker, Tom, et al.; "Distributed Acoustic Sensing—a new tool for seismic applications", First Break, vol. 32, Issue: 2, pp. 61-69, Feb. 2014.
Shoji, Yuya, et al.; "Magneto-optical non-reciprocal devices in silicon photonics", Sci. Technol Adv. Mater. 15, 2014, 10 pages.
Pintus, Paolo, et al.; "Microring-Based Optical Isolator and Circulator with Integrated Electromagnet for Silicon Photonics", Journal of Lightwave Technology, vol. 35, No. 8, 2017, pp. 1429-1437.
International Search Report/Written Opinion; PCT/US2019/061827; dated Mar. 17, 2020, 11 pages.

\* cited by examiner

INTEGRATED FIBER-OPTIC PERTURBATION SENSOR

BACKGROUND

The subject matter disclosed herein relates to systems and methods for improving distributed acoustic sensing techniques.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In a distributed acoustic sensing system, optical fibers are leveraged to measure dynamic strain, motion, and/or sound by measuring disturbances to light transmitted through them. For example, a distributed acoustic sensing system may generate light from a laser source, transmit the light through a fiber-optic cable (e.g., fiber cable), and sense disturbances to the back-scattered light from various points along the fiber-optic cable. The sensed disturbances may be analyzed by a computing device of the distributed acoustic sensing system and used to determine amounts motion associated with the physical path the light was transmitted through (e.g., the physical path through which the fiber-optic cable is located within, such as ground, air, water, or the like) relative to a baseline motion. Distributed acoustic sensing systems are typically large, bulky, and expensive pieces of equipment.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, embodiments may encompass a variety of forms that may be similar to or different from the embodiments set forth below.

In one embodiment, a system may include a substrate, a computing device that performs one or more edge processing operations disposed on the substrate, and an integrated photonic circuit that performs distributed acoustic sensing operations and is also disposed on the substrate. The integrated photonic circuit may include a light source, a circulator, and a photodiode. The light may transmit a first light pulse. The circulator may transmit the first light pulse to a fiber-optic cable. The circulator may also receive a back-scattered light pulse based at least in part on the first light pulse. The circulator may transmit the back-scattered light pulse to the photodiode. The photodiode may generate one or more electrical signals based at least in part on the portion of the back-scattered light pulse.

In another embodiment, a method may include transmitting a light pulse via an integrated distributed sensing system to a sensing fiber to be returned to the integrated distributed sensing system as a returned light. The method also may include receiving a portion of the returned light at a photodiode that converts an optical signal to an electrical signal. The method may also include digitizing the electrical signal into one or more digital signals and re-ordering the one or more digital signals based at least in part on sensing location, sampling time, and pulse index. Further, the method may include binning the one or more electrical signals into one or more spectral frequency bins based at least in part on frequencies of the one or more electrical signals.

In yet another embodiment, an integrated photonic circuit may include a light source, a circulator coupled to the light source, and a photodiode coupled to the circulator. The light source may transmit a light pulse. The circulator may protect a light source from at least a portion of a back-scattered light pulse corresponding to the light pulse. The photodiode may convert the portion of the back-scattered light pulse into one or more electrical signals associated with a sensing operation based at least in part on multiple returned light signals including the back-scattered light pulse.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
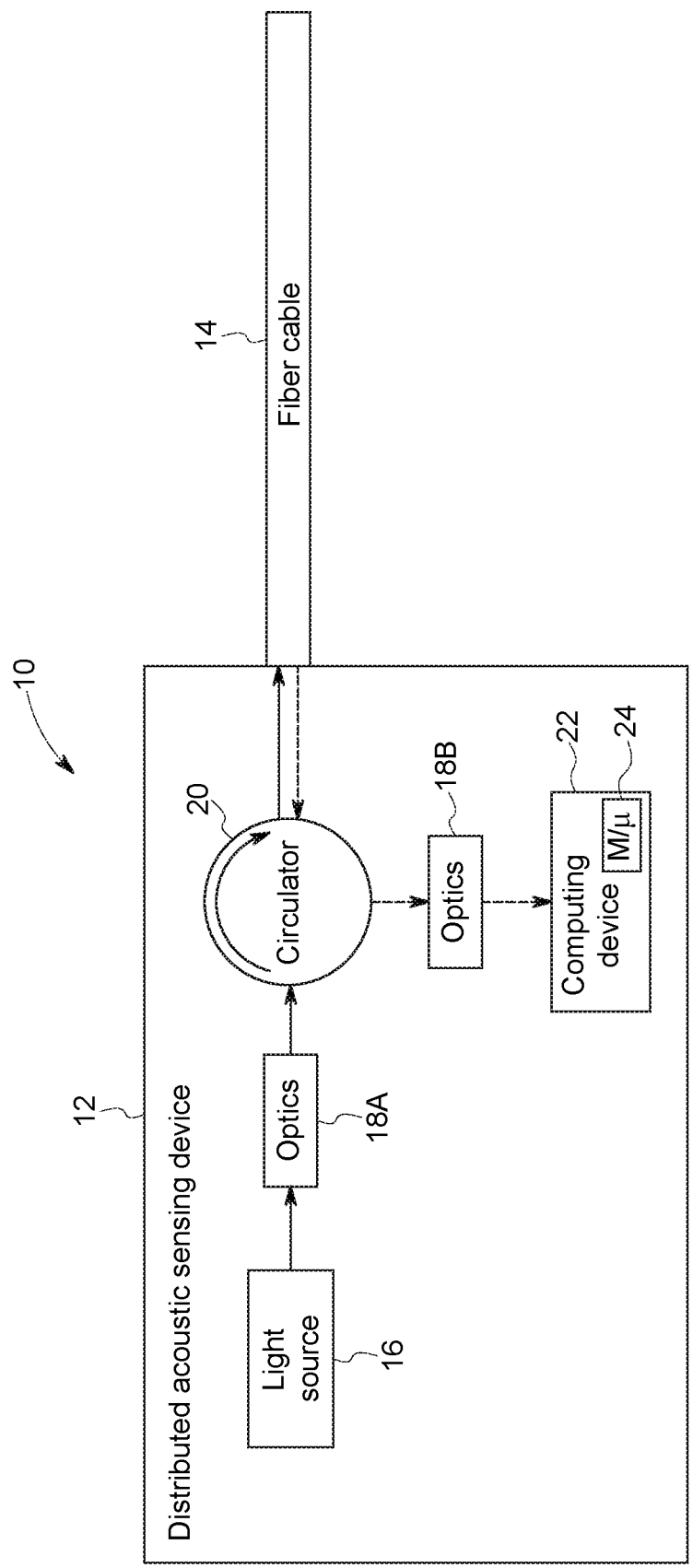
FIG. 1 is a block diagram of a distributed acoustic sensing system, in accordance with aspects of the present approach.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are related to the manner in which a distributed acoustic sensing device is integrated to become a photonics integrated circuit. Generally, a distributed acoustic sensing system may include dedicated light sources and/or laser generation devices, optical receives, and other optical equipment. However, this equipment of the distributed acoustic sensing system may be large, cumbersome, and/or expensive. Integrating the distributed acoustic sensing system to become an integrated photonic circuit may integrate complex optical and electrical circuits to be packed into small volumes. An integrated photonic circuit may include various active structures such as one or more light sources, one or more modulators, one or more tunable filters, one or more photodiodes or other suitable measurement device, one or more electronic chips, or the like, along with passive structures such as one or more waveguides, one or more splitters, one or more Mach Zehnder interferometers, one or more Bragg gratings, one or more ring filters, or the like to perform similar to optics components of the distributed acoustic sensing device.

Keeping the foregoing in mind, embodiments of the present disclosure describe systems and methods for using integrated photonic circuit components to replace optical components. To integrate the distributed acoustic sensing device functionality onto an integrated photonic circuit, several simplifications may be performed. Considerations include eliminating one or more amplifiers, a polarization diversity receiver (PDR), a linearization circuit, and a delay line. Removing the optical gain (e.g., the one or more amplifiers) causes detection of back-scattered light signals (e.g., Rayleigh back-scatter) to be difficult, but introducing integrated semiconductor optical amplifiers permits detection of the back-scattered light signals. Furthermore, occurrence of polarization fading may increase when the PDR is removed, but may be mitigated by introducing data processing techniques to ignore one or more faded zones associated with the polarization fading. Effects of the integration may include improvements to overall size and cost of fabricating a device to perform distributed acoustic sensing. For example, a size of the integrated photonic circuitry may be approximately 4 centimeters cubed ($cm^3$) and thus smaller than a size of the distributed acoustic sensing device which may be approximately 48,000 $cm^3$.

By way of introduction, FIG. 1 is a block diagram of a distributed acoustic sensing system 10 that, as described above, may be replicated using an integrated photonic circuit, as described in more detail before with FIGS. 2 through 9B. The distributed acoustic sensing system 10 may include a distributed acoustic sensing device 12 that generates light pulses for transmission through a fiber-optic cable to sense vibrations that affect signal characteristics of the light (e.g., an acoustic response) when returned from the fiber cable 14. Sometimes the fiber-optic cable may be disposed within a capillary tube to help protect the fiber-optic cable from physical material, such as dirt, ground, rain, or the like. Although described as one fiber-optic sensing path, it should be understood that the distributed acoustic sensing system 10 may include one or more of each depicted components to provide one or more fiber-optic sensing paths that may or may not be grouped together. Moreover, although a single light pulses is described, it should be understood that in operation one or more light pulse may be transmitted and measured to interrogate the length of the fiber-optic cable, such as the length of the fiber cable 14 within the capillary tube. Although the capillary tube is described, it should be understood that a fiber-optic cable may be disposed within or near a variety of materials, structures, or the like, to facilitate performing sensing operations. For example, a fiber-optic cable may be disposed on a turbine blade to sense vibration associated with the turbine blade.

As shown in FIG. 1, the distributed acoustic sensing system 10 may include a light source 16 that generates light pulses for transmission via one or more fiber-optic cables or other suitable acoustic transmission structure (e.g., a waveguide) through optics components 18 (e.g., 18A, 18B) and a circulator 20 before transmitting through the fiber cable 14. The light source 16 may be a semiconductor laser that produces one or more light pulses (e.g., laser pulses) into a transmission structure for transmission through the optics components 18A. The optics components 18 may include a variety of suitable optical processing components such as one or more variable attenuators, one or more pump filters, one or more erbium doped fiber amplifiers (EDFA), one or more couplers, one or more pulser components, one or more faraday mirrors, one or more compensator components, one or more discrete fiber-coupled devices, one or more pump lasers, or the like. Furthermore, the optic components 18 may include combinations of the listed components. For example, an EDFA may include one or more pumps lasers and one or more wavelength couplers, in addition to fiber-optic components such as a coil of erbium-doped fiber cable. After optical processing, the light pulse may be transmitted through the circulator 20.

The circulator 20 may be any suitable component that permits light transmission in a forward direction from a first point to a second point and that permits light transmission in a reverse direction from the second point to a third point but that does not permit light transmission in a reverse direction from the second point to the first point. For example, the light pulse transmitted from the optics components 18A may proceed through the circulator to the fiber cable 14 and may return to the optics components 18B via the circulator 20 without proceeding through the optics components 18A.

After being directed by the circulator 20, the light pulse may be transmitted through the optics components 18B to the computing device 22.

The fiber cable 14 may be the portion of the distributed acoustic sensing system 10 that interfaces with a material to perform sensing operations. For example, the fiber cable 14 may interface with ground, dirt, or earth when the distributed acoustic sensing device 12 is used to determine amounts of vibration along a physical path underground. The fiber cable 14 may interface with a variety of suitable materials for performing a variety of sensing operations. Suitable materials may include ground, air, water, or the like. The light pulse transmitted via a fiber cable 14 within the capillary tube may be sensitive to vibrations. After the light pulse scatters back from the fiber-optic cable, the circulator 20 receives the light pulse and directs the light pulse to the optics components 18B for optical processing. After optical processing, the light pulse is transmitted from the optics components 18B to a computing device 22 associated with the distributed acoustic sensing device 12.

The computing device 22 and/or the optics components 18A and/or 18B may facilitate performing one or more processing operations on the light pulse that is returned to enhance vibration detection sensitivity of the fiber-optic cable. The computing device 22 may include memory and/or processing circuitry 24 to perform the processing operations. The memory and/or processing circuitry 24 may also store one or more results from the sensing operation performed by the distributed acoustic sensing system 10. In some embodiments, optics components 18 include one or more components to facilitate providing a reference light such that the computing device 22 may use the reference light to perform processing operations. For example, discerning an acoustic response, or the response of the fiber-optic cable to vibrations as determined through amplitude, frequency and/or phase of the light pulse received by the computing device 22 from the circulator 20, may include using a delay line or mirror coupled between the circulator 20 and a light source 16.

With the preceding in mind, integrating the distributed acoustic sensing device 12 onto an integrated photonic circuit may enable increasingly complex optical and electrical circuits to be packed into smaller volumes and smaller footprints when compared to the non-integrated distributed acoustic sensing system 10. By integrating the functionality into an integrated photonic circuit, distributed acoustic sensing techniques may be used in one or more applications that might otherwise be too small to suitably fit the previous distributed acoustic sensing systems, for example in various airplane components.

Figure 2:
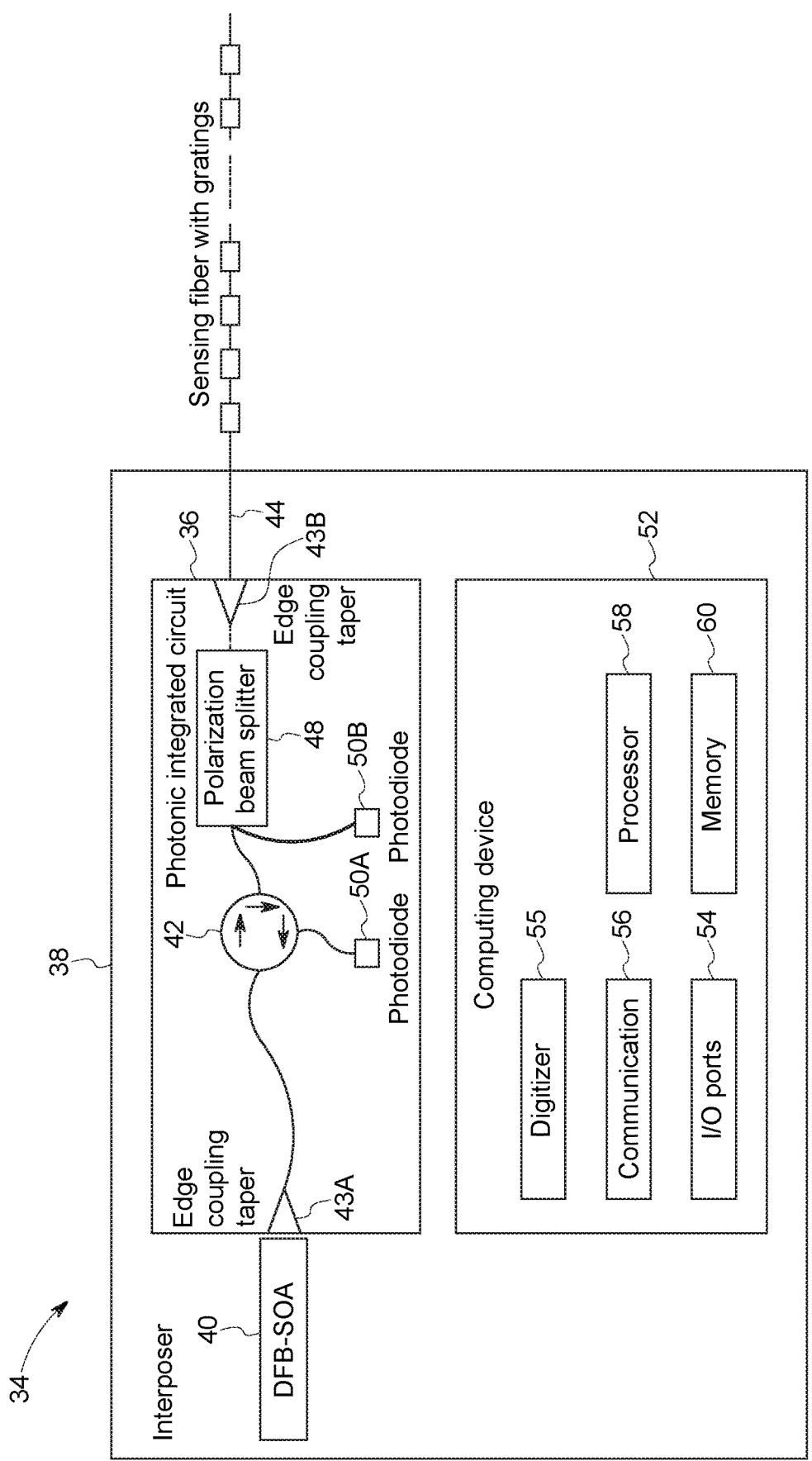
FIG. 2 is a block diagram of an example integrated photonic circuit for performing similar distributed acoustic sensing operations, as described in relationship with the distributed acoustic sensing system of FIG. 1, in accordance with aspects of the present approach.

FIG. 2 is a block diagram of an example integrated distributed acoustic sensing system 34 that includes an integrated photonic circuit 36 to perform similar distributed acoustic sensing operations as performed by the distributed acoustic sensing device 12. The integrated photonic circuit 36 is disposed on an interposer 38. The interposer 38 is a substrate upon which the integrated photonic circuit 36 is secured and may include one or more structures to aid in an alignment of a distributed feedback plus semiconductor optical amplifier light source (DFB-SOA) 40 and a fiber-optic cable to the integrated photonic circuit 36. As used herein, substrate refers to the base layer of a chip, printed circuit board, disk platter, multichip module, integrated circuit device, or the like, and many materials may be used to provide the substrate, including silicon. The interposer 38 may also provide one or more electrical couplings between components of the integrated photonic circuit 36. In some embodiments, the interconnect functions provided by the interposer 38 may also be provided by the integrated photonic circuit 36 eliminating the use of the interposer 38.

Similar to the previously described distributed acoustic sensing system 10 of FIG. 1, the DFB-SOA 40 generates a light pulse (e.g., laser pulse, light) that transmits via a transmission structure (e.g., fiber-optic cable, free-space path, waveguide) to a circulator 42 through an edge coupling taper 43A. The edge coupling tapers 43 (e.g., edge coupling taper 43A, edge coupling taper 43B) may transition the light pulse between the integrated photonic circuit 36 and the sensing fiber 44 and/or the DFB-SOA 40 (e.g., from a waveguide to the sensing fiber 44). The circulator 42 may be any suitable component that permits light transmission in a forward direction from a first point to a second point and that permits light transmission in a reverse direction from the second point to a third point but that does not permit light transmission in a reverse direction from the second point to the first point. For example, the light pulse transmitted from the DFB-SOA 40 may proceed through sensing fiber 44 and may return to a photodiode 50A as part of a back-scattered light pulse without proceeding through to the DFB-SOA 40. As such, the circulator 42 may include one or more switches, one or more switched modulators, one or more ring modulators, one or more Mach Zehnder interferometers modulators, or the like, to direct light transmission.

Figure 5:
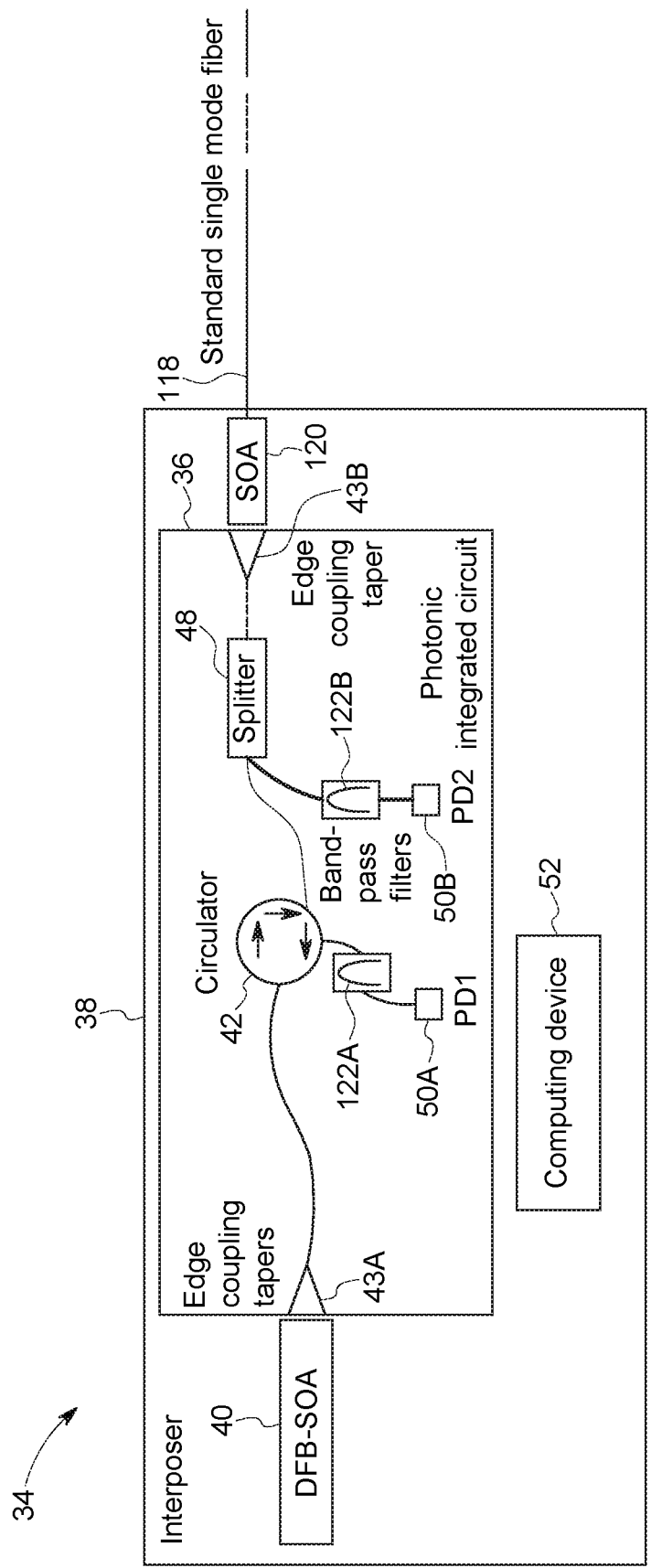
FIG. 5 is a block diagram of another example of the integrated photonic circuit of FIG. 2, in accordance with aspects of the present approach.

After being directed by the circulator 42, the light pulse transmits through a polarization beam splitter 48. In a forward direction (e.g., transmission from the DFB-SOA 40 to the sensing fiber 44), the polarization beam splitter 48 permits the light pulse from the circulator 42 to pass through to the sensing fiber 44. The polarization beam splitter 48 passes the light pulse through the edge coupling taper 43B and to the sensing fiber 44. The polarization beam splitter 48 may be located between the circulator 42 and a physical boundary of the integrated photonic circuit 36, where the sensing fiber 44 is disposed beyond the physical boundary of the integrated photonic circuit 36. As depicted, the sensing fiber 44 includes one or more gratings, however, it should be understood that the sensing fiber 44, in some embodiments, may not include the one or more gratings (e.g., such as is depicted in FIG. 5). The gratings are designed to be partial reflectors which may be used to partially reflect light back toward the integrated photonic circuit as a back-scattered light pulse. The one or more gratings may reflect the light pulse as it is transmitted through the sensing fiber 44, therefore maintaining signal fidelity and/or maintaining signal amplitudes during transmission.

After the light pulse returns from the sensing fiber 44 as one or more back-scattered light pulses (e.g., since the back-scattered light pulse is returned from one or more portions of the fiber cable 14 via the partial reflectors), the edge coupling taper 43B transitions the back-scattered light pulses from the sensing fiber 44 to the integrated photonic circuit 36. The back-scattered light pulses collected at the polarization beam splitter 48 from the sensing fiber 44 may be a collection of transverse magnetic wave (TM) mode energy and transverse electric wave (TE) mode energy because the polarization (e.g., TM, TE) of the light pulse from the circulator 42 may not be maintained during transmission through the sensing fiber 44. Thus, in the reverse direction, the polarization beam splitter 48 may separate the TM mode energy from the TE mode energy and transmit the TM mode energy to a different photodiode than the TE mode energy. For example, the TM mode energy may be transmitted to the photodiode 50A while the TE mode energy may be transmitted to the photodiode 50B. It should be noted that although described as receiving a particular mode, the integrated photonic circuit 36 may be designed such that either photodiode 50 may receive either mode energy. The circulator 42 may block this reverse-direction light from interfering with the DFB-SOA 40 or a concurrent light transmission by not permitting light split at the polarization beam splitter 48 to pass through the circulator 42 or by not more than a threshold or tolerance amount.

After splitting and transmitting through the circulator 42, the energy modes of the back-scattered light pulses are separately collected at the photodiodes 50 (e.g., 50A, 50B). The photodiodes 50 generate one or more electrical signals in response to received optical signals (e.g., the back-scattered light pulses split into the two modes). The photodiodes 50 may output the one or more electrical signals to a computing device 52, such as via one or more input/output (I/O) ports 54 of the computing device 52. The computing device 52 may digitize the signals and use the one or more digital signals in one or more edge processing operations to reduce a size of a sample dataset represented by the one or more data signals. By reducing a size of the sample dataset analyzed by the computing device 52, computing resources used to process, transmit, store, or otherwise use the sample dataset may also be reduced. In this way, the one or more edge processing operations may decrease a volume of data that is to be moved from the computing device 52 for other analysis, storage, use, or the like.

The computing device 52 may include a variety of components to process the one or more electrical signals, such as a digitizer component 55, communication component 56, a processor 58, a memory 60, the I/O ports 54, and the like. The processor 58 may be any type of computer processor or microprocessor capable of executing computer-executable code. For example, the processor 58 may include a control component that operates a timing circuit, a pulse generator, and a laser controller to operate the DFB-SOA 40 to generate a light for sensing. The memory 60 may be any suitable article of manufacture that may serve as media to store processor-executable code, data, or the like. These articles of manufacture may represent computer-readable media (i.e., any suitable form of memory or storage) that may store the processor-executable code used by the processor 58 to perform the presently disclosed techniques, such as to perform signal processing and/or analysis of the one or more digital signals from the photodiodes 50.

The I/O ports 54 may couple to one or more sensors, one or more input devices, one or more displays, or the like to facilitate controlling the integrated photonic circuit 36 or to facilitate analysis of the one or more digital signals. For example, operation of the DFB-SOA 40 may be adjusted via control signals outputted by the I/O ports 54 based at least in part on the one or more digital signals received by the I/O ports 54. In some embodiments, the digitizer component 55 may couple to the I/O ports 54 to facilitate conversion of the one or more electrical signals into one or more digital signals received by the I/O ports 54. It should be noted that in some embodiments, each of the depicted components of the computing device 52 may be partially or wholly implemented on or within one or more field programmable gate arrays (FPGAs), programmable logic devices (PLDs), application-specific integrated circuits (ASICs) or the like. Although specific components and applications have been called out, many different combinations of components may be used to integrate the distributed acoustic sensing device 12 as the integrated photonic circuit 36.

Figure 3:
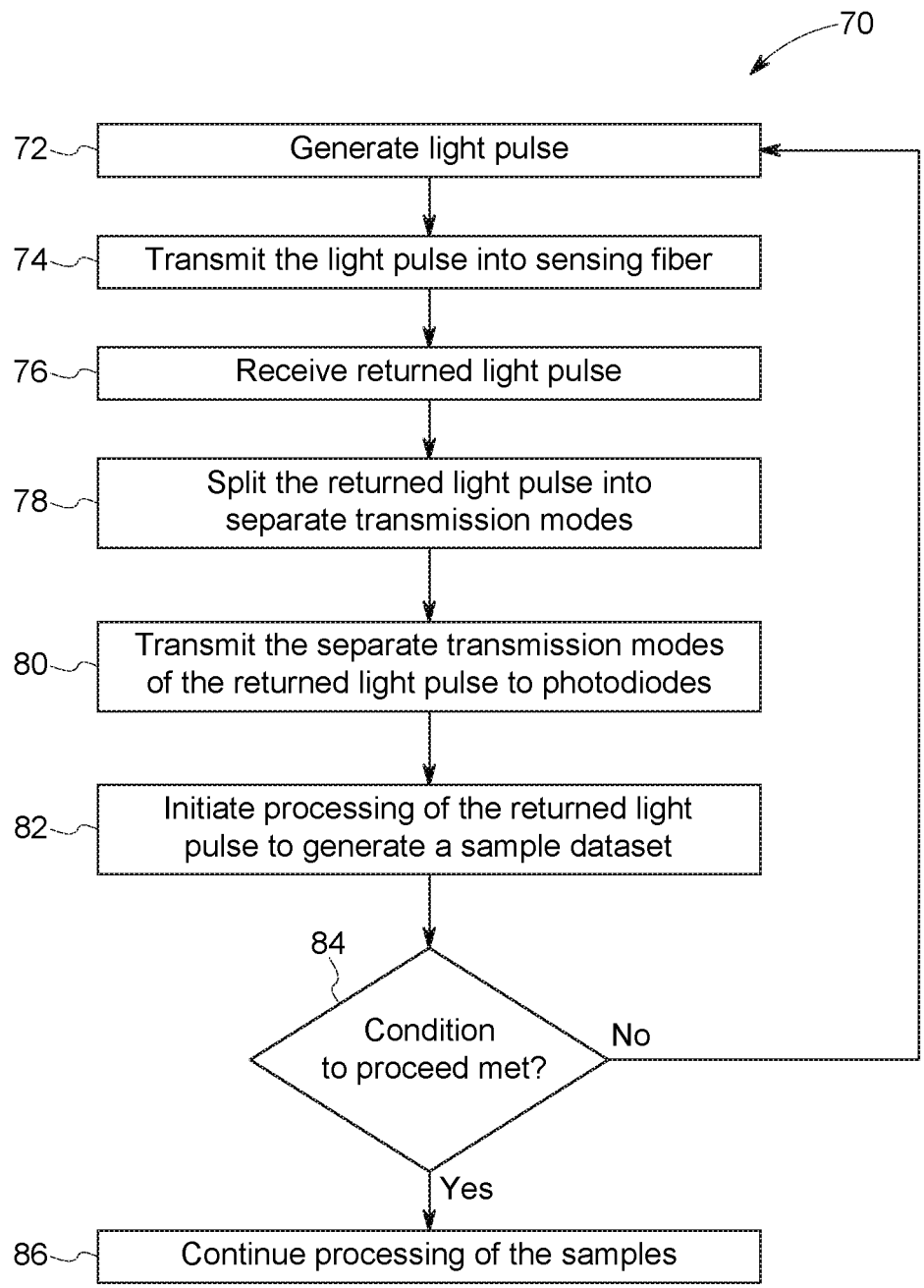
FIG. 3 is a process flow of a method for operating the integrated photonic circuit of FIG. 2 to perform distributed acoustic sensing operations, in accordance with aspects of the present approach.

To help describe operation of the integrated distributed acoustic sensing system 34, FIG. 3 is a process flow of a method 70 for operating the integrated photonic circuit 36 and/or the integrated distributed acoustic sensing system 34. Although the following description of the method 70 is detailed in a particular order to facilitate explanation, it should be noted that the steps of the method 70 may be performed in any suitable order. Moreover, although the method 70 is described as being performed by the computing device 52, it should be understood that the method 70 may be performed by any suitable computing device or controller.

At block 72, the computing device 52 and/or suitable controller may operate the DFB-SOA 40 to transmit a light pulse (e.g., light, laser pulse) to the integrated photonic circuit 36. Before operating the DFB-SOA 40, the integrated distributed acoustic sensing system 34 may be calibrated to confirm the DFB-SOA 40 is transmitting light at a suitable wavelength or of suitable properties.

At block 74, the computing device 52 and/or suitable controller may operate the circulator 42, the polarization beam splitter 48, and/or other components not depicted, to transmit the light pulse through the integrated photonic circuit 36 to output to the sensing fiber 44. The light pulse may scatter back is it propagates along the sensing fiber 44 and eventually return to the integrated photonic circuit 36 at a later time as back-scattered light pulses. The back-scattered light (e.g., back-scattered light pulses) may be retuned quite differently from the light pulse transmitted for sensing, for example, the back-scattered light may be stretched or delayed in time and/or modulated by acoustics, or the like. Since the returned signals may be quite different than the light pulse transmitted for sensing, herein the one or more returned signals are referred to as the back-scattered light pulse. Thus, at block 76, the integrated photonic circuit 36 may receive the returned light pulse, such as at the edge coupling taper 43B.

At block 78, the computing device 52 and/or suitable controller may operate the polarization beam splitter 48 to split the back-scattered light into the separate transmission modes. For example, the polarization beam splitter 48 may separate the TM mode energy from the TE mode energy for respective transmission through the integrated photonic circuit 36. After splitting the respective energy mode, the respective back-scattered light pulses may be of a substantially uniform energy mode. The TM mode energy back-scattered light pulses may be split from the TE mode energy back-scattered light pulses and rotated to a TE mode, so both portions are routed on the integrated photonic circuit in the same mode. At block 80, the computing device 52 and/or suitable controller may respectively operate the circulator 42 and/or polarization beam splitter 48 to transmit the separate energy modes of the back-scattered light pulses to the photodiodes 50 for detection and conversion to electrical signals. At the photodiodes 50, the separate energy modes of the back-scattered light pulses are respectively recorded in a digital domain after conversion into the electrical domain (e.g., from an optical domain). For example, one or more transimpedance amplifiers (TIAs) may convert the photodiode 50 signals into voltages (e.g., electrical signals) for an analog-to-digital converter or a digitizer component 55 to convert into a digital signal.

At block 82, the computing device 52 and/or suitable controller may initiate processing of the back-scattered light pulses and generate a sample dataset based on the digital signal. This processing may include one or more edge processing operations, such as re-ordering one or more digital signals associated with the back-scattered light pulses to develop a dataset and/or ignoring one or more faded zones associated with the polarization fading. For example, when the light pulse is returned from the sensing fiber 44, the resulting dataset may be in a reverse or incorrect order for analysis, and thus the digital data may be reordered to generate a sample dataset that is interpretable or useable for analysis and processing.

At block 84, the computing device 52 and/or suitable controller may determine whether a condition to proceed is met. For example, the computing device 52 and/or suitable controller may determine whether a size of the sample dataset equals a threshold count amount (e.g., chunk-based monitoring or processing), whether a particular duration of time of sampling has passed (e.g., chunk-based monitoring or processing), whether a sample is completed being captured and/or gathered (e.g., as may be the case in a system that uses continuous monitoring or processing instead of or in addition to chunk-based monitoring or processing). This check may be to ensure that a sample dataset is of a predetermined size before continuing with processing of the sample dataset. In response to determining that the condition is not met, the computing device 52 and/or suitable controller repeats the method 70 and, at block 72, generates another light pulse to repeat sensing.

However, in response to the computing device 52 and/or suitable controller determining the condition is met, at block 86, the computing device 52 and/or suitable controller may continue processing of the sample dataset as part of one or more edge processing operations. For example, the one or more edge processing operations may help to reduce a size of the sample dataset to reduce computing resources used to process, transmit, store, or otherwise use the sample dataset. In this way, once the dataset is of suitable size, the one or more edge processing operations may be used to then reduce the size of the sample dataset to compress data while maintaining sensing results or trends. For example, a field programmable gate array (FPGA) of the computing device 52 may perform one or more fast Fourier transforms (FFTs) on the received signals for binning of the received signals into spectral bins as part of a FFT operation. Processing (e.g., edge processing) the received signals (e.g., such as binning into spectral frequency bins) may help reduce a volume of data prior to transmission of the data to the processor 58 for further processing, storage (e.g., via the memory 60), and/or transmission (e.g., via the communication component 56). This additional processing may analyze the digital data corresponding to complete the sensing operation (e.g., to arrive at one or more conclusions about dynamic strain, strain, vibration, motion, or the like associated with the sensing fiber 44).

Figure 4A:
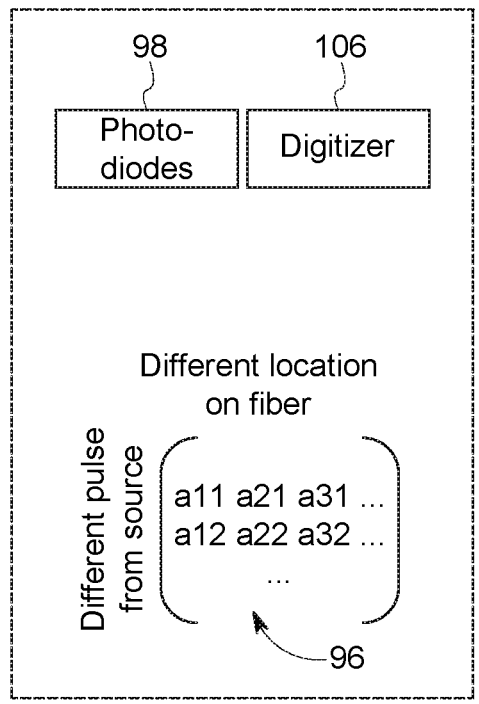
FIG. 4A-4D are illustrations of example data processing performed in the method of FIG. 3, in accordance with aspects of the present approach.
Figure 4B:
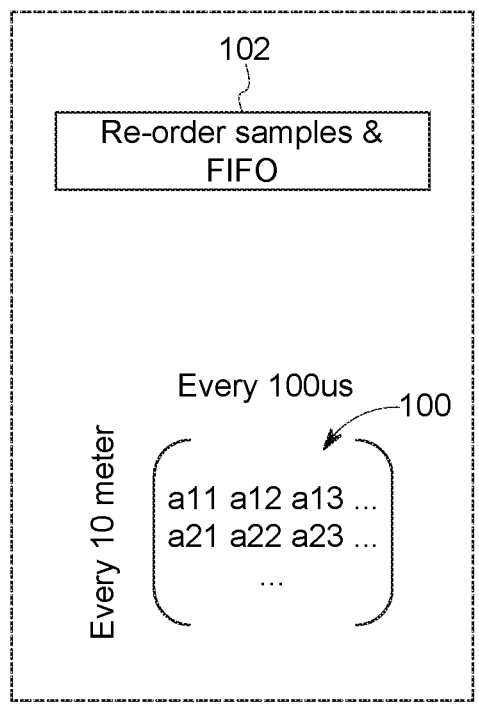
Figure 4C:
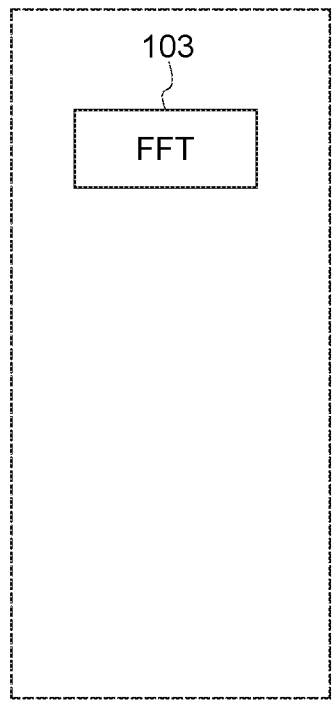
Figure 4D:
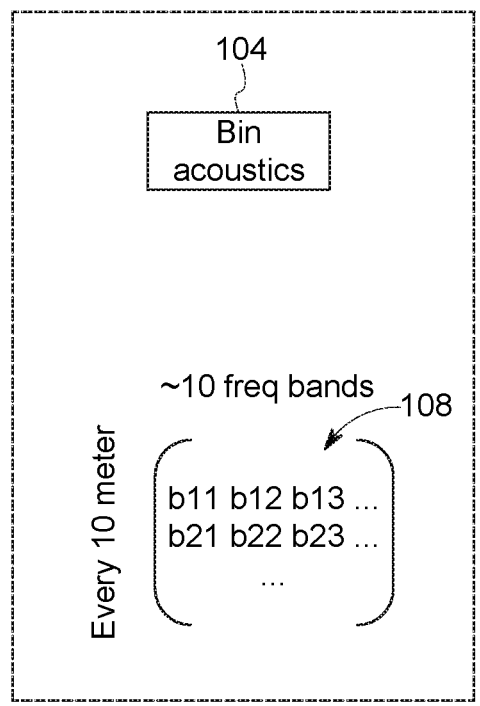

FIG. 4A-D are illustrations of example data processing operations, such as the one or more edge processing operations, associated with the method 70. FIG. 4A is an illustration of the dataset 96 generated by the computing device 52 based on the back-scattered light pulses received by the photodiodes 50 (e.g., represented by block 98 of FIG. 4A) from the sensing fiber 44. FIG. 4B is an illustration of a reordering result as a sample dataset 100 generated by the computing device 52 (e.g., represented by block 102 of FIG. 4B. FIG. 4C is an illustration of a FFT block 103 representing the FFT operation performed by the computing device 52 to improve binning operations. FIG. 4D is an illustration of binning performed by the computing device 52, as represented by bin acoustics block 104. For ease of explanation, FIG. 4A-D are explained together without particular referencing to each respective figure.

As depicted in FIG. 4A through 4D, the DFB-SOA 40 may have already generated a light pulse for transmission through the integrated photonic circuit 36 to perform sensing operations with the sensing fiber 44. As depicted, the back-scattered light pulses received over time may correspond to different locations on the sensing fiber 44. For example, a sample a11 was received before a sample a21 and a sample a21 represents a location further on the sensing fiber 44 than the sample a11, even though both were recorded as part of a same sensing operation. Samples a12, a22, a32, and so on may be received as a result of a subsequently transmitted light pulse.

The photodiodes 50 may work with a digitizer (e.g., represented by block 106) to convert the back-scattered light pulses into one or more digital signals associated with the dataset 96. The digitizer may operate the photodiodes 50 to generate digital signals based on particular intervals corresponding to a pulse duration of the light pulse received by photodiodes 50. For example, the DFB-SOA 40 may generate a 20 meter (m) long light pulse using 100 nanosecond (ns) pulse durations but the pulse durations of the back-scattered light may increase during scatter back such that the photodiodes 50 and the digitizer sample a light pulse with a length of 100 microseconds (µs). As different light pulses are generated by the DFB-SOA 40 and received by the photodiodes 50 and digitizer component 55 for digitization, the one or more digital signals associated the different light pulses may be associated with the dataset 96 after the digital signals are received by the computing device 52. When the computing device 52 receives a newly converted digital signal from the photodiodes 50 and/or the digitizer component 55, the computing device 52 may re-order the digital signal (e.g., digital samples) such that sensing locations correspond to each other over time.

To elaborate, in the dataset 96, the digital signals are received over time with respect to a first sensing operation (e.g., that happened at a first time). For example, sample a11 was recorded as part of the same sensing operation as sample a12 but both are re-ordered (e.g., as effect of the re-ordering block 102) to correspond to the physical location of the sensing fiber 44 relative to the other measurements. In this way, the re-ordering causes sample a11 to remain in a same position in the dataset, and moves sample a12 to correspond to a column array associated to a next sampling position. The re-ordering may also reorder a sample a13, a sample a14, and so on into the corresponding column array to the next sampling position. Re-ordering may be performed in a variety of suitable ways such that the computing device 52 may be able to process the re-ordered samples of the sample dataset 100. Re-ordering of the one or more data signals may be performed based at least in part on sensing location and sampling time. The sensing location and sampling time may be inherent properties to the dataset associated with the one or more digital data signals, where these inherent properties may be determined based on relative positioning to other data of the digital data signals (e.g., relative timing, relative location). In this way, each returned light (e.g., back-scattered light pulse) may correspond to a sensing location and a sensing time. After re-ordering, a length of the sample dataset 100 (e.g., a number of columns) may correspond to a duration of the sampling period.

As described above with the method 70, at the block 84, the computing device 52 may wait to proceed with processing until a threshold count of samples are associated with the sample dataset 100. After collecting the threshold count of samples, at the block 86, the computing device 52 may continue with processing. For example, the computing device 52 may perform a fast Fourier transform (FFT) using the FFT block 103 using subsets of data from the sample dataset that correspond to the same location (e.g., the same column). The FFT block 103 may perform a FFT operation for each location associated with the sensing fiber 44. After the FFT operation, the computing device 52 may bin the digital data from the FFT operation into spectral bins. Spectral bins may correspond to one or more frequency bands and may be stored or transmitted by the computing device 52 as a spectral binning dataset 108. This processing of the received signals (e.g., such as binning into spectral bins via bin acoustics block 104) may help reduce a volume of data prior to presentation of the data to the processor 58 for further processing, storage (e.g., via the memory 60), and/or transmission (e.g., via the communication component 56).

The computing device 52 and/or other suitable computing device may leverage the processed digital data to monitor sensing conditions. In one embodiment, the computing device 52 and/or other suitable computing device may compare samples between the different locations to determine when a particular sample is associated with an abnormal condition for a particular location. In another embodiment, the computing device 52 and/or other suitable computing device may monitor trends in the sampling over time to determine a change from a normal to abnormal condition for a particular location. Other suitable techniques may be used in addition to these techniques described that monitor a sampling location over time to determine abnormal conditions or to compare sampling locations to determine abnormal conditions. It should also be noted that although the above-described operations are discussed with respect to digital data and digital signals, some embodiments may perform one or more processing operations on analog data signals interpretable by one or more processing and/or computing devices. These analog data signals, similar to the digital data signals described above, may still be based on the back-scattered light pulses in the optical domain being converted into electrical signals in the electrical domain.

With the foregoing in mind, FIG. 5 is a block diagram of another example of the integrated photonic circuit 36 of FIG. 2. In particular, FIG. 5 illustrates the integrated photonic circuit 36 having a sensing fiber 118 without gratings. To operate the integrated distributed acoustic sensing system 34 with the sensing fiber 118, several components may be added to the integrated photonic circuit 36. For example, a semiconductor optical amplifier (SOA) 120 and bandpass filters 122 (e.g., 122A, 122B) are added to the integrated photonic circuit 36 to accommodate the sensing fiber 118 without gratings. Other components used in the integrated distributed acoustic sensing system may operate as previously described, for example edge coupling tapers 43 may continue to transmit light between the DFB-SOA 40 that generates the light pulses, the sensing fiber 118 for sensing, and the integrated photonic circuit 36 for transmission and processing.

The SOA 120 may amplify light transmitting between the integrated photonic circuit 36 and the sensing fiber 118. In this way, the light pulse transmitted from the SOA 120 may have a sufficiently large amplitude such that back-scattered light pulses of suitable strength are returned back to the SOA 120. After the back-scattered light pulses return, the SOA 120 amplifies the back-scattered light again for transmission to the polarization beam splitter 48 and for transmission to the circulator 42. The SOA 120 may amplify the back-scattered light such that the back-scattered light pulses outputted from the SOA 120 have a suitable signal amplitude detectable by the photodiodes 50. In some embodiments, the SOA 120 may provide a 7 dB gain for the outgoing light pulse and a 17 dB gain for the back-scattered light pulses.

Through use of the SOA 120, amplifier noise may be introduced into the returned light signal after the amplification. The bandpass filters 122 may be included to compensate for the added amplifier noise. The amplifier noise may be outside of a particular wavelength band associated with the light pulse generated by the DFB-SOA 40. In this way, the bandpass filters 122 may permit the particular wavelength band and not permit wavelength bands outside of the particular wavelength band (e.g., transmits a particular range of light wavelengths). The bandpass filters 122 may cause signals outside of the particular wavelength band to attenuate such that the photodiodes 50 are unable to detect the noise introduced by the SOA 120.

The circuitry described above with respect to FIG. 2 and FIG. 5 use self-interference of back-scattered light from a single transmitted (e.g., coherent) light pulse. Light from different locations of the sensing fiber 44 and/or the sensing fiber 118 scatter from different portions of the single transmitted light pulse (e.g., the transmitted light) such that one or more portions of the light pulse returns coincident in space and time. The light pulse that returns coincident (e.g., back-scattered light pulses) interferes on the receiving photodiodes 50 permitting analysis of one or more detectable changes caused by the interference and detected in the one or more digital signals received by the computing device 52. The systems and methods of sensing using the self-interference techniques may be effective at detecting dynamic strains on the sensing fiber 44 and/or the sensing fiber 118.

Figure 6:
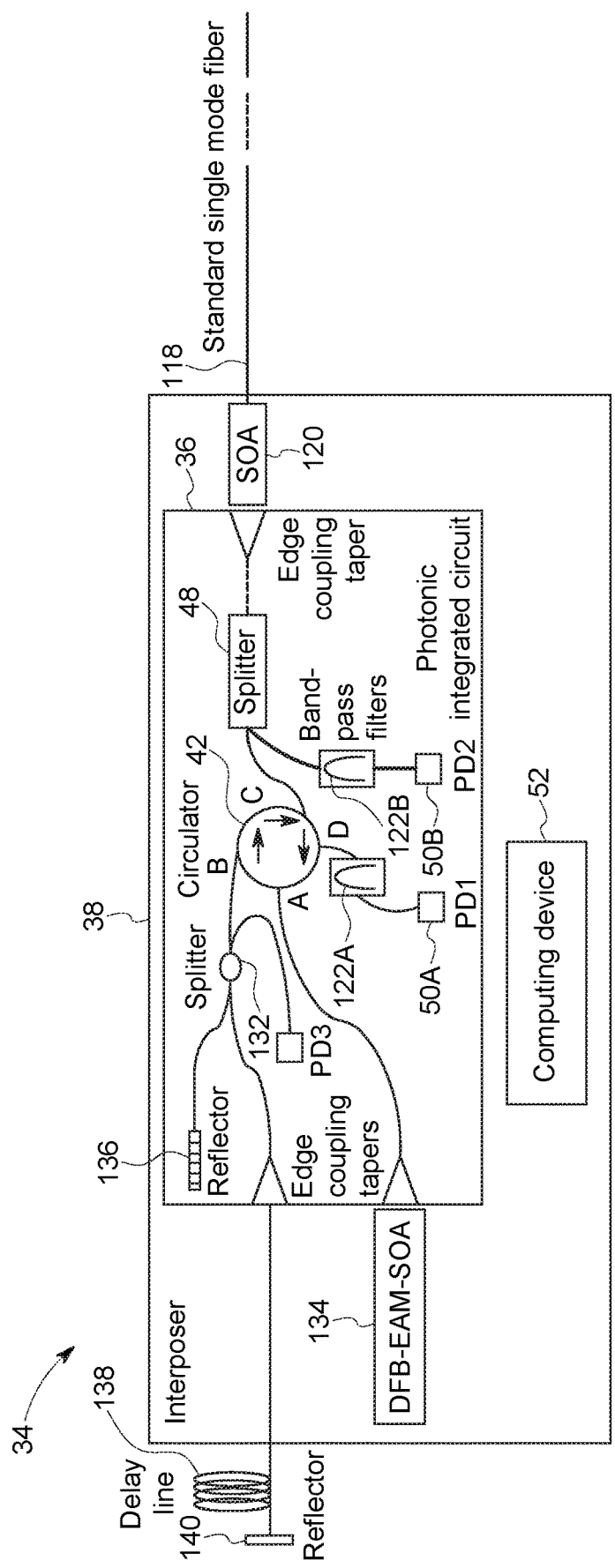
FIG. 6 is a block diagram of another example of the integrated photonic circuit of FIG. 2, in accordance with aspects of the present approach.

An additional sensing technique may leverage interference from two pulses rather than self-interference. FIG. 6 is a block diagram of another example of integrated distributed acoustic sensing system 34 of FIG. 2 including arrangements and circuitry to perform a sensing based on interference from two pulses. In this example, the integrated distributed acoustic sensing system 34 uses the sensing fiber 118 without gratings and thus resembles the example depicted in FIG. 5 having the SOA 120 and the bandpass filters 122.

To generate two pulses, a splitter 132 may be used. The splitter 132 divides the transmitted light from a distributed feedback laser with electro-absorption modulator plus semiconductor optical amplifier light source (DFB-EAM-SOA) 134 such that a portion of the light (e.g., first pulse) transmits to a reflector 136 and a portion of the light (e.g., second pulse) transmits to a delay line 138 and then a reflector 140. In this way, the first pulse (e.g., transmitted to the reflector 136) reflects off the reflector 136, passes through the circulator 42 and the polarization beam splitter 48, and continues transmission through the sensing fiber 118, as described above. While the first pulse transmits, the second pulse transmits through the delay line 138 twice, reflecting off the reflector 140 to initiate the return pass through the delay line 138. The delay line 138 may cause the second pulse to delay a suitable time period to cause back-scatter from the first pulse from one position along the sensing fiber to interfere with back-scatter from the second pulse from a second position along the sensing fiber 118. In this way, the first pulse fully-overlaps the second pulse such that the resulting interference is transmitted to the receiving photodiodes 50 (e.g., 50A, 50B).

In some embodiments, the delay line 138 is several meters long. This arrangement may enable the returned light to have improved signal fidelity over previous embodiments. Furthermore, the delay line 138 is depicted as extending beyond the boundary of the integrated photonic circuit 36 and/or the interposer 38. It should be understood that in some embodiments, the delay line 138 may be of suitable length such that it may physically be disposed on the interposer 38 and/or the integrated photonic circuit 36. An additional photodiode 50C may be included to help the computing device 52 and/or other suitable computing device to monitor the pulses. Monitoring the pulses, for example, may help the computing device 52 determine when to transmit an additional light pulse for a next sensing operation. It is noted that this embodiment may include the sensing fiber 44 with gratings from FIG. 2 and exclude the sensing fiber 118 without gratings from FIG. 5, or include any suitable combination of the sensing fiber 44 and the sensing fiber 118. The SOA 120 and the bandpass filters 122 may be included or excluded as suitable for combinations of sensing fibers. For example, an embodiment may use have two sensing paths and thus may include circuitry to support the sensing fiber 118 and the sensing fiber 44.

The circulator 42, as described above with reference to the integrated photonic circuit 36, may selectively permit light to transmit to different outputs based on control signals from the computing device 52. If a light source receives light returned from the sensing fiber 118, the light source may destabilize during the sensing operation which is undesirable for sensing operations. Thus, the circulator 42 may protect the light source, such as the DFB-SOA 40 or the DFB-EAM-SOA 134 from back-scatter (e.g., light reflections) associated with the sensing fiber 118 by redirecting the back-scattered light pulses to the photodiodes 50. In this way, many suitable devices may be used as the circulator 42 as long as the device operates in a similar way to selectively permit light transmission and protect the light source from returned light. As such, the circulator 42 may include one or more switches, one or more switched modulators, one or more ring modulators, one or more Mach Zehnder interferometers modulators, or the like, to direct light transmission.

Figure 7A:
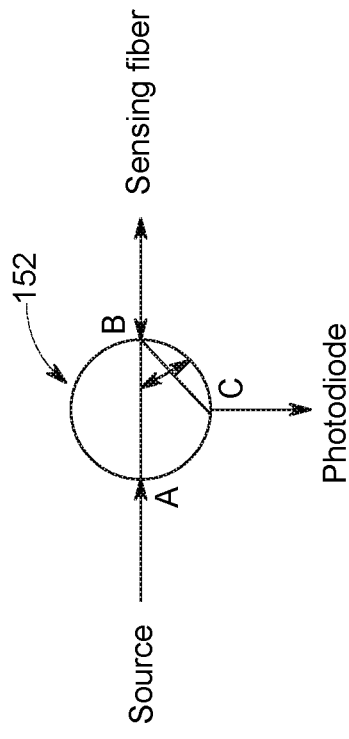
FIG. 7A is an illustration of an example switch to perform the function of a circulator associated with the integrated photonic circuits of FIG. 2, FIG. 5, and FIG. 6, in accordance with aspects of the present approach.

FIG. 7A is an illustration of an example circulator 42 embodiment of the integrated photonic circuit 36 depicted in FIG. 2, FIG. 5, and FIG. 6. FIG. 7A depicts a switch 152 that may be operated as the circulator 42. While in a first state, the switch 152 permits light transmission in a first direction, such as from a light source (e.g., DFB-SOA 40) via terminal A to a sensing fiber (e.g., the sensing fiber 44). The switch 152 changes from the first state to a second state in response to a control signal, such as a control signal transmitted from the computing device 52 (e.g., in response to detecting back-scattered light pulses via the photodiode 50C, in response to a timer indicating a sufficient time has passed). While in the second state, the switch 152 permits light transmission in a second direction, such as from the sensing fiber via terminal B to a photodiode (e.g., photodiode 50A) via terminal C. In addition, while in the second state, the switch 152 may not permit light transmission in a third direction, that is from the sensing fiber via the terminal B to the light source via the terminal A. In this way, the switch 152 may protect the light source from the back-scattered light pulses. It should be appreciated that one or more of the switch 152 may be cascaded and used to replace the circulator 42 (e.g., such as when the sensing fiber 118 is used). In the example depicted in FIG. 2, one switch 152 may replace the circulator 42, while in the example depicted in FIG. 6, more than one switch 152 may be used to replace the circulator 42. Thus, a number of switches (e.g., switch 152) used to replace the circulator 42 may be based at least in part on a number of terminals that the light pulse transmits through during operation of the integrated distributed acoustic sensing system 34 (e.g., four of FIG. 6 vs. three of FIG. 2 and FIG. 5).

Figure 7B:
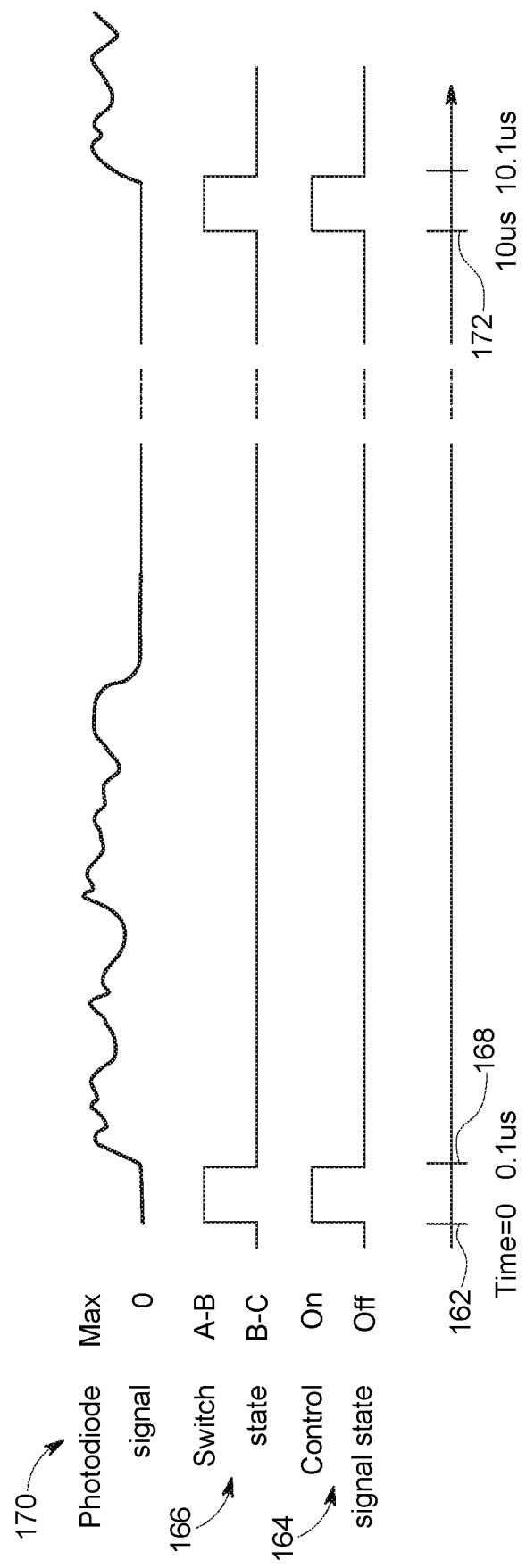
FIG. 7B is a timing diagram of inputs into the switch of FIG. 7A to facilitate distributed acoustic sensing operations, in accordance with aspects of the present approach.

To help explain switch 152 operation, FIG. 7B is a timing diagram of signals associated with the switch 152 of FIG. 7A. As depicted, at a time 162, the switch 152 is operated in a first state (e.g., on state) by a control signal 164. While in the first state, the switch 152 transmits from terminal A to terminal B, as indicated by switch state signal 166. When the switch 152 transmits from the terminal A to the terminal B, no light is received at the photodiode for this light pulse. By a time 168, the switch 152 is operated in a second state (e.g., off state) by the control signal 164. While in the second state, the switch 152 permits light transmission from terminal B to terminal C but not from terminal B to terminal A, thereby protecting the light source (e.g., DFB-SOA 40 or the DFB-EAM-SOA 134) from the back-scattered light pulses. This transmission may manifest as an electrical signal 170 transmitted from the photodiode coupled to the terminal C (e.g., photodiode 50A). The electrical signal 170 may transmit until the back-scattered light has completed transmission through the switch 152. As depicted, the back-scattered light transmission ended (e.g., corresponding to electrical signal 170 value of 0) prior to the switch 152 being operated back into the first state by the control signal 164. At a time 172, the control signal 164 operates the switch 152 in the first state and the process of light transmission may repeat until a completion of the sensing operation.

Figure 8:
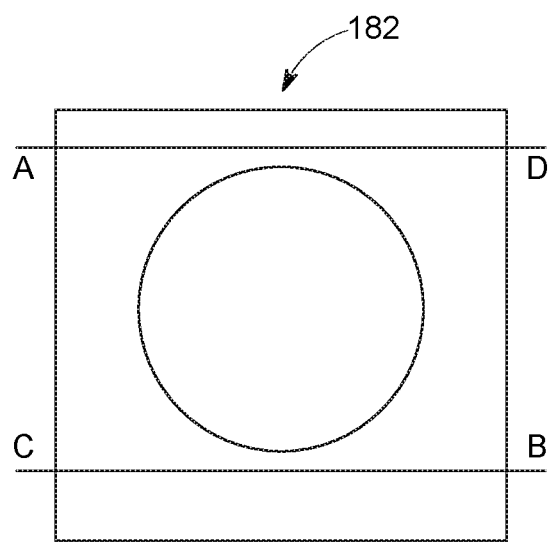
FIG. 8 is an illustration of an example ring modulator to perform the function of the circulator associated with the integrated photonic circuits of FIG. 2, FIG. 5, and FIG. 6, in accordance with aspects of the present approach.

FIG. 8 is an illustration of another example circulator 42 of the integrated distributed acoustic sensing system 34 depicted in FIG. 2, FIG. 5, and FIG. 6. FIG. 8 depicts a ring modulator 182, which may be considered an embodiment of the switch 152. The ring modulator 182 may be integrated into the integrated distributed acoustic sensing system 34 by using magneto-optic material. The magneto-optic material may create a suitably permanent structure without switching. Careful tuning of the light source (e.g., the DFB-SOA 40 or the DFB-EAM-SOA 134) may also accompany use of the ring modulator 182 as the structure may transmit light differently when the light has a wavelength substantially similar to a resonant wavelength of the structure. A light pulse incoming to terminal A may output from terminal C and signals incoming to terminal C may output from terminal B. In this way, the ring modulator 182 may be coupled to a switch, waveguide, or other suitable transmission pathway to permit the back-scattered light to transmit out from the terminal C and back in to the terminal B.

Figure 9A:
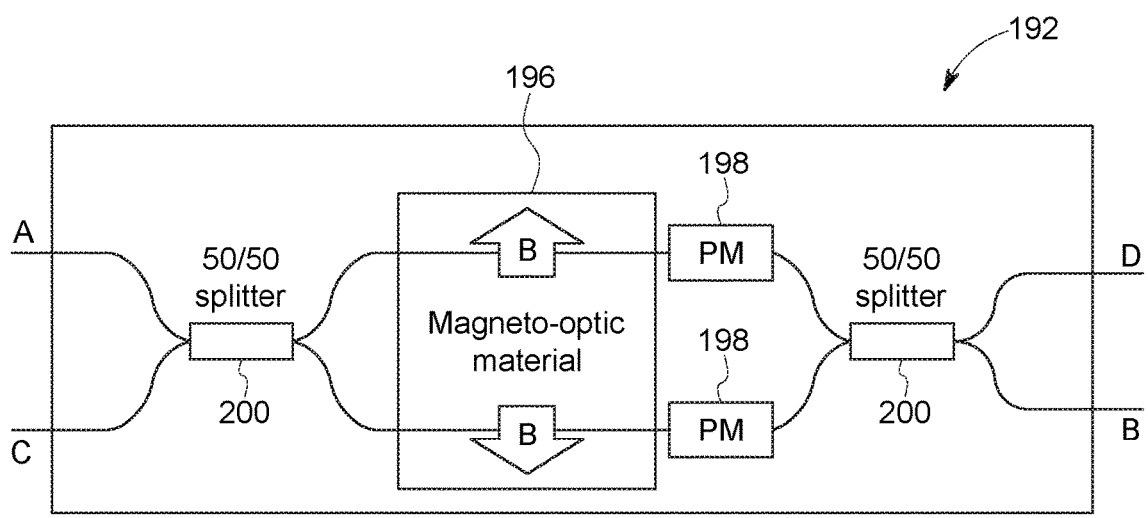
FIG. 9A-B are block diagrams of an example Mach Zehnder Interferometer (MZI) to perform the function of the circulator associated with the integrated photonic circuits of FIG. 2, FIG. 5, and FIG. 6, in accordance with aspects of the present approach.
Figure 9B:
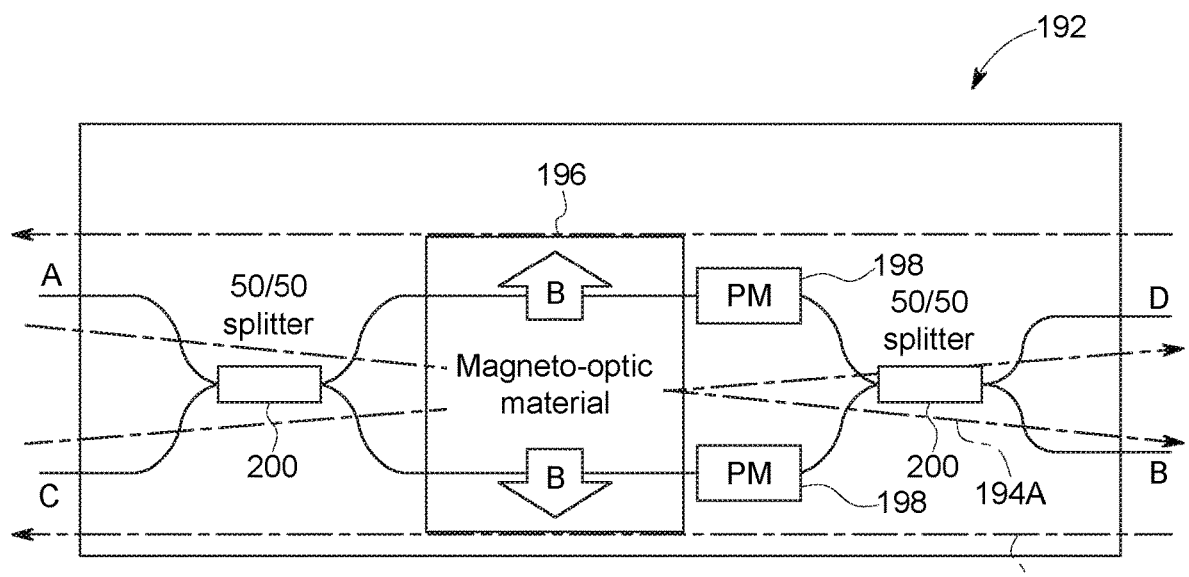

FIG. 9A is an illustration of yet another example circulator 42 of the integrated distributed acoustic sensing system 34 depicted in FIG. 2, FIG. 5, and FIG. 6. FIG. 9 depicts a Mach Zehnder Interferometer (MZI) 192. FIG. 9B is an illustration of the MZI 192 of FIG. 9A and light transmission pathways 194 (e.g., 194A, 194B) that may be permitted using the MZI 192. FIG. 9A and FIG. 9B are discussed together for ease of discussion. The MZI 192 may transmit light in a similar pattern as the switch 152. For example, a light inputted at terminal A of the MZI 192 may transmit from terminal B (e.g., pathway represented by pathway 194A) and a light inputted at the terminal B may transmit from terminal C (e.g., pathway represented by pathway 194B) but is not permitted to transmit from the terminal B to the terminal A.

The MZI 192 may permit this operation through non-reciprocal phase shifting based at least in part on the inclusion of a magneto-optic material 196 and/or permanent magnetic fields 198 and one or more splitters 200 that divide an incoming light pulse in half for transmission through pathways 194. Tuning of the MZI 192 may be performed during manufacturing by selecting a suitable combination of the magneto-optic material 196 and waveguide design. For example, various differential phase shifts may be introduced based on the combination of the magneto-optic material 196 and the waveguide design. By tuning the MZI 192, operation of the MZI 192 may be fixed to permit cross-coupling in a forward direction and parallel-coupling in a reverse direction—meaning that, the terminal A permits light transmission to the terminal B when light transmits in a first direction (e.g., forward direction) and the terminal B permits light transmission to the terminal C when light transmits in a second direction (e.g., in a reverse direction to the forward direction). The combination of the magneto-optic material 196 and waveguide design may also serve to provide some control over transmissible bandwidths. For example, the MZI 192 may be designed to permit a 15 nanometer (nm) bandwidth. In some embodiments, this may be an improvement over using the ring modulator 182 as the circulator 42. Another benefit from using a suitably tuned MZI 192 is that no switching may be used to control transmission of the light pulse through the MZI 192 (not true of the ring modulator 182 or the switch 152).

In some embodiments, a rotator may be included between the DFB-SOA 40 or the DFB-EAM-SOA 134 and the circulator 42. The rotator may rotate a polarization of the light pulse from a TE mode energy into a TM mode energy. The circulator 42 may operate using TM mode energy while the DFB-SOA 40 or the DFB-EAM-SOA 134 may output light pulses having a TE mode energy. Thus, the rotator may be included to permit transmission between these components. It should be noted that one or more rotators may be coupled between one or more components that may rely on translation of the energy modes for suitable operation.

Technical effects of this disclosure include designs and methods of integrating distributed acoustic sensing systems on to a substrate including an integrated photonic circuit. An integrated distributed acoustic sensing system may have the particular improvement as being smaller, more portable, cheaper to manufacture, and more practical to use for sensing operations on turbines, airplanes, or any suitable area where size constraints are of concern when compared to non-integrated distributed acoustic sensing systems. As described above, one or more integrated components may be used to perform one or more sensing operations associated with distributed acoustic sensing while remaining physically smaller than previous distributed acoustic sensing systems.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a substrate;
   a computing device configured to perform one or more edge processing operations and disposed on the substrate; and
   an integrated photonic circuit disposed on the substrate and configured to perform distributed acoustic sensing operations and to transmit one or more electrical signals to the computing device, wherein the integrated photonic circuit comprises:
   a light source configured to transmit a first light pulse;
   a circulator configured to transmit the first light pulse to a fiber-optic cable and to receive a back-scattered light pulse based at least in part on the first light pulse, wherein the circulator is configured to protect the light source from at least a portion of the back-scattered light pulse; and
   a photodiode configured to receive at least a portion of the back-scattered light pulse and to generate the one or more electrical signals based at least in part on the portion of the back-scattered light pulse.

2. The system of claim 1, wherein the fiber-optic cable is configured as a sensing fiber disposed within a capillary tube.

3. The system of claim 1, wherein the photodiode is configured to convert at least the portion of the back-scattered light pulse into one or more electrical signals and is configured to transmit the one or more electrical signals to a digitizer to generate one or more digital signals based at least in part on the one or more electrical signals.

4. The system of claim 1, wherein the integrated photonic circuit comprises one or more bandpass filters and an amplifier configured to amplify the back-scattered light pulse before transmission to the circulator.

5. The system of claim 1, comprising a polarization beam splitter coupled between the circulator and a physical boundary of the integrated photonic circuit, wherein the fiber-optic cable is configured to be a sensing fiber beyond the physical boundary.

6. The system of claim 5, wherein the circulator is configured to receive the back-scattered light pulse comprising a uniform energy mode from the polarization beam splitter.

7. The system of claim 1, wherein the computing device comprises control circuitry configured to control at least the circulator and the light source, input/output circuitry configured to receive the one or more electrical signals from the photodiode, a processor, and a memory comprising one or more instructions that, when executed by the processor, cause the processor to perform the one or more edge processing operations to the one or more electrical signals from the photodiode.

8. The system of claim 1, wherein the integrated photonic circuit comprises a delay line and a reflector, and wherein a splitter receives the first light pulse and transmits a second light pulse to the reflector and a third light pulse to the delay line.

9. The system of claim 1, wherein the circulator comprises one or more switches, one or more switched modulators, one or more ring modulators, one or more Mach Zehnder interferometers modulators, or any combination thereof.

10. The system of claim 1, comprising a computing device configured to:
   operate the light source to transmit the first light pulse;
   receive a portion of the back-scattered light pulse from the photodiode as the one or more electrical signals;
   re-order the one or more electrical signals based at least in part on a sensing location and a sampling time, wherein the sensing location and sampling time are both inherent at least in part to the one or more electrical signals; and
   bin the one or more electrical signals into one or more spectral frequency bins based at least in part on frequencies of the one or more electrical signals.

11. A method, comprising:
- transmitting a light pulse via an integrated distributed sensing system to a sensing fiber to be returned to the integrated distributed sensing system as a returned light;
- receiving a portion of the returned light at a photodiode configured to convert an optical signal to an electrical signal;
- digitizing the electrical signal into to one or more digital signals;
- re-ordering the one or more digital signals based at least in part on a sensing location, a sampling time, a pulse index, or any combination thereof; and
- binning the one or more electrical signals into one or more spectral frequency bins based at least in part on frequencies of the one or more electrical signals.

12. The method of claim 11, wherein the binning of the one or more digital signals comprises performing one or more fast Fourier transforms based on the sensing location associated with the one or more digital signals.

13. The method of claim 11, wherein the re-ordering is performed to generate a sample dataset, and wherein the sample dataset is analyzed to determine whether the one or more digital signals equals a threshold count.

14. The method of claim 11, comprising operating a circulator at least in part by generating one or more control signals, wherein the circulator is configured to selectively transmit light through the integrated distributed sensing system in response to the one or more control signals.

15. The method of claim 14, wherein the circulator comprises one or more switches, one or more switched modulators, one or more ring modulators, or any combination thereof.

16. An integrated photonic circuit, comprising:
- a light source configured to transmit a light pulse;
- a circulator configured to protect the light source from at least a portion of a back-scattered light pulse corresponding to the light pulse, wherein the circulator is coupled to the light source; and
- a photodiode coupled to the circulator and configured to convert the portion of the back-scattered light pulse into one or more electrical signals associated with a sensing operation based at least in part on a plurality of returned light signals comprising the back-scattered light pulse.

17. The integrated photonic circuit of claim 16, wherein the circulator is configured to receive a first energy mode of the back-scattered light pulse, and wherein the first energy mode comprises transverse magnetic wave (TM) mode energy or transverse electrical wave (TE) mode energy.

18. The integrated photonic circuit of claim 16, comprising a filter coupled between the photodiode and the circulator, wherein the filter is configured to transmit a particular range of light wavelengths.

19. The integrated photonic circuit of claim 16, comprising one or more partial reflectors configured to reflect a light to be transmitted as the back-scattered light pulse.

20. The integrated photonic circuit of claim 16, comprising an additional photodiode configured to receive an energy mode of light different from an energy mode received by the photodiode, wherein the photodiode is configured to couple with a computing device, and wherein the computing device is configured to analyze the one or more electrical signals based at least in part on one or more electrical signals generated by the additional photodiode.

* * * * *